(12) United States Patent
Cheng

(10) Patent No.: US 6,835,224 B2
(45) Date of Patent: Dec. 28, 2004

(54) OPEN END DIESEL PARTICULATE TRAP

(75) Inventor: Shi-Wai S. Cheng, Troy, MI (US)

(73) Assignee: General Motors Corporation, Detroit, MI (US)

(*) Notice: Subject to any disclaimer, the term of this patent is extended or adjusted under 35 U.S.C. 154(b) by 84 days.

(21) Appl. No.: 10/336,119

(22) Filed: Jan. 3, 2003

(65) Prior Publication Data

US 2004/0128964 A1 Jul. 8, 2004

(51) Int. Cl.$^7$ .............................................. B01D 46/24
(52) U.S. Cl. ........................ 55/428; 55/385.3; 55/429; 55/484; 55/498; 55/523; 55/DIG. 30; 60/311
(58) Field of Search ............................... 55/385.3, 428, 55/429, 434, 484, 498, 523, DIG. 20, DIG. 30; 60/311

(56) References Cited

U.S. PATENT DOCUMENTS

| | | | |
|---|---|---|---|
| 3,440,800 A | * | 4/1969 | Messen-Jaschin ............ 55/429 |
| 4,329,162 A | * | 5/1982 | Pitcher, Jr. |
| 4,478,618 A | * | 10/1984 | Bly et al. |
| 4,509,966 A | * | 4/1985 | Dimick et al. |
| 4,584,003 A | | 4/1986 | Oda et al. ...................... 55/269 |
| 4,732,594 A | * | 3/1988 | Mizrah et al. ......... 55/DIG. 30 |
| 4,833,883 A | * | 5/1989 | Oda et al. |
| 4,913,712 A | | 4/1990 | Gabathuler et al. ........... 55/482 |
| 4,924,668 A | | 5/1990 | Panten et al. ................. 60/278 |
| 5,013,340 A | * | 5/1991 | Taslim et al. .................. 55/429 |
| 5,019,142 A | * | 5/1991 | Waschkuttis .................. 55/429 |
| 5,181,943 A | * | 1/1993 | Weber .......................... 55/523 |
| 5,303,547 A | * | 4/1994 | Mieville et al. .............. 60/311 |
| 5,713,972 A | * | 2/1998 | Snyder, Sr. ............ 55/DIG. 30 |
| 6,471,918 B1 | * | 10/2002 | Sherwood .............. 55/DIG. 30 |

FOREIGN PATENT DOCUMENTS

DE            37 09 671        10/1988

* cited by examiner

Primary Examiner—Duane Smith
Assistant Examiner—Jason M. Greene
(74) Attorney, Agent, or Firm—Kathryn A. Marra

(57) ABSTRACT

An open end diesel particulate trap for removing particulates from the exhaust gas stream of the diesel engine includes a housing having an inlet opening, an outlet opening and a gas outlet and an exhaust gas path extending from the inlet opening to the gas outlet. A first portion of the exhaust gas path leads from the inlet and extends at an angle to a second portion of the exhaust gas path leading to the gas outlet. A filter element is disposed in the housing and includes a central aperture defining the first path portion. The filter element has a wall of filter material surrounding the central aperture through which the second path portion extends. A particulate reservoir is in communication with the outlet opening. When exhaust gas flows from the inlet opening to the gas outlet, particulates in the exhaust gas flowing along the first path portion can fall into the reservoir and particulates in the exhaust gas flowing along the second path portion can be trapped in the filter element wall.

18 Claims, 1 Drawing Sheet

OPEN END DIESEL PARTICULATE TRAP

BACKGROUND OF THE INVENTION

The present invention relates generally to particulate traps for exhaust treatment systems in diesel engines and, in particular, to an open end diesel particulate trap.

Exhaust treatment systems for diesel engines are well known. Exhaust treatment systems generally include a particulate filter in the exhaust piping that is utilized to remove particulates, which are typically composed of partially burned hydrocarbons, from the engine exhaust stream. The particulate filter includes a housing and a filter element disposed therein, known in the art as a ceramic wall-flow monolith particulate filter. A typical ceramic wall-flow monolith particulate filter includes an outer wall interconnected by a large number of interlaced, thin porous internal walls that define a honeycomb structure to provide parallel channels extending along the length of the outer wall from a one end of the filter to an opposite end of the filter. Exhaust gas enters the one end of the filter and exits through the opposite end. Alternate cell channel openings on the one end of the filter are blocked and, at the opposite end the alternate channel openings are blocked in a similar manner but displaced by one cell, which defines a plurality of parallel inlet cells and outlet cells. With this filter arrangement, the exhaust gas cannot flow directly through a given inlet cell because of the blocked ends and is forced to flow through the separating porous walls into an adjacent outlet cell. The exhaust gas is filtered as it flows through the porous walls between adjacent cells because the thin porous walls of the monolith trap the particulate. A typical particulate filter has a cell density ranging from 100 to 300 cells per square inch and has a length longer than 6 inches. These long, slim channels and closed ends allow this kind of filter to trap particulate very effectively, often trapping particulates in the size range of less than 0.1 micron.

Eventually, though, the cells of the filter become clogged with the trapped particulate and the filter must be cleaned in order to remain effective. The filter is typically cleaned utilizing a thermal generation process, such as by introducing a heat source to the cells to raise the temperature of the cells enough to cause the trapped particulate to oxidize. These traditional filters, however, are very difficult to clean thermally because of the long slim channels and because of the closed ends. In addition to the use of the thermal regeneration process, filters can be cleaned manually, which is also made difficult by the slim channels and closed ends. In addition, because of the blocked ends, airflow through the filter drops to zero adjacent the blocked end, which results in an uneven concentration of particulates with a heavier concentration of particulates located at the blocked ends. Ash, which is metallic components in the diesel particulate, can not be cleaned utilizing the thermal regeneration process and, therefore, must be cleaned manually, resulting in high maintenance costs.

It is desirable, therefore, to provide a particulate filter for diesel engines that is efficient and easy to clean either mechanically or thermally.

SUMMARY OF THE INVENTION

The present invention concerns a particulate filter operable to be installed in an exhaust system of an internal combustion engine, such as a diesel engine. The particulate filter according to the present invention includes a housing having an inlet and an outlet. The inlet of the housing is preferably connected to piping extending from the diesel engine. The outlet of the housing is preferably connected to piping that extends to atmosphere. The filter housing defines an exhaust gas path from the inlet to the outlet. A first portion of the exhaust gas path leads from the inlet and extends at an angle to a second portion of the exhaust gas path leading to the outlet. Preferably, the first portion of the exhaust gas path is approximately perpendicular to the second portion of the exhaust gas path. At least one elongated, generally tubular filter element is disposed in the housing and has a wall surrounding a central aperture extending between first and second ends. The wall of the filter element and the wall of the housing define an outlet chamber therebetween. The first end of the filter aperture is connected to the housing inlet and the first path portion extends along a longitudinal axis of the aperture. A particulate reservoir is attached to the housing and is connected to the second end of the filter element aperture. When the exhaust gas enters the inlet, flows along the aperture and through wall of the at least one filter element, enters the outlet chamber, and exits the outlet, some of the particulates in the exhaust gas remain in the at least one filter element and are burned when the at least one filter element is heated, creating ash which drops to and is collected in the particulate reservoir. Other particulates in the first path portion can fall into the particulate reservoir as the exhaust gas changes direction to follow the second path portion.

The filter is preferably of the ceramic filter type. In one embodiment, the filter is a single filter element that has the central aperture formed therein. Alternatively, the filter is a plurality of wall-flow type filters elements each including a central aperture and being positioned to provide parallel gas flow paths.

In operation, the particulate filter is installed in the exhaust system of the internal combustion engine. The inlet of the housing is connected to piping extending from the internal combustion engine and the outlet of the housing is connected to piping that extends to atmosphere. The engine is operated normally, which produces an exhaust stream that contains particulates entrained therein. The exhaust stream enters the inlet of the housing, travels along the central aperture along the first path portion, travels through the wall of the filter element along the second path portion, enters the outlet chamber, and exits the outlet of the housing.

During operation, some of the entrained particulate may drop from the exhaust gas travelling along the first path portion into the particulate reservoir due to gravitational force. The entrained particulate in the exhaust gas passing through the wall can be trapped by the filter element. Because there is no closed end, the exhaust flow velocity at the bottom end of the wall-flow filter is advantageously not zero. Consequently, the particulate will deposit more evenly along the axial length of the wall-flow filter element. If a thermal regeneration is initiated from the upstream side of the filter element, the hot oxidant can reach the bottom end of the filter easily because of the open end, thus producing a more thorough regeneration. After thermal regeneration, the metallic ash can drop into the particulate reservoir, again due to gravitational force. The normal vibration of the vehicle may also shake some of the deposited particulate and ash off from the filter surface. The particular geometry of the filter and the exhaust gas path allows the flaked-off particulate to drop down into the particulate reservoir. When the particulate reservoir is removed from the housing, the filter surface is accessible due to the open end, which allows the filter surface to be cleaned mechanically.

Another advantage of the particulate filter according to the present invention over prior art particulate filters is that more frontal open area can be assigned to the intake side of the filter than to the exhaust side of the filter. Prior art particulate filters typically have the same area for the intake and exhaust sides. Since particulate will deposit on the surface of the intake side, one needs more frontal open area to minimize the flow restriction.

The particulate filter according to the present invention is more durable and consumes less energy during thermal regeneration than prior art particulate filters. For applications that require mechanical regeneration and cleaning, the present invention provides the maximum advantage over the prior art particulate filters.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
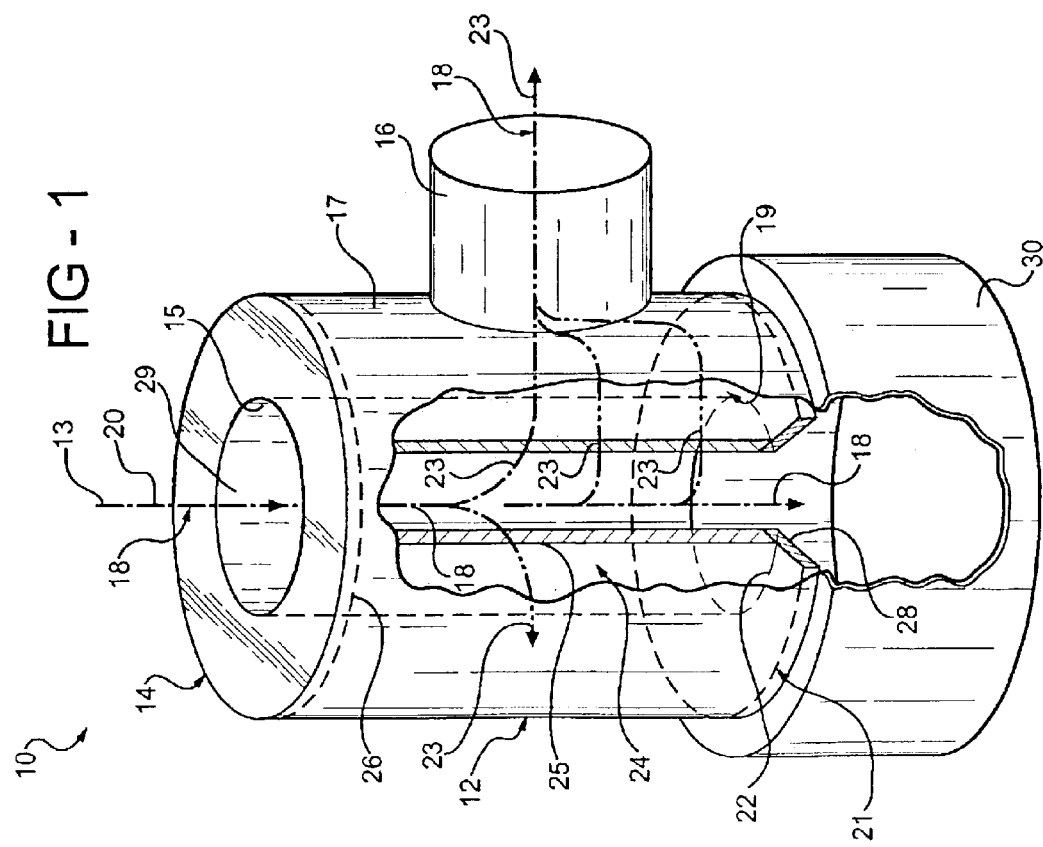
FIG. 1 is a fragmentary perspective view of a particulate filter in accordance with the present invention.

Referring now to FIG. 1, an open end diesel particulate trap or diesel particulate filter according to the present invention is indicated generally at 10. The particulate filter 10 is adapted to be installed in the piping of an exhaust system of an internal combustion engine (not shown), such as a diesel engine installed in a vehicle (not shown). The particulate filter 10 includes a generally cylindrical hollow housing 12 having a generally vertically extending longitudinal axis 13 and a first end wall 14 with an inlet opening 15 formed therein at an upper end of the housing. An exhaust gas outlet 16 extends from a side wall 17 of the housing 12 generally perpendicular to the longitudinal axis 13. The inlet opening 15 is preferably connected to piping (not shown) extending from an exhaust manifold (not shown) of the internal combustion engine. The gas outlet 16 is preferably connected to piping (not shown) that further extends to atmosphere.

The particulate filter 10 defines an exhaust gas path 18 that leads through the interior of the housing 12 from the inlet opening 15 to the exhaust gas outlet 16. A generally vertical first portion 20 of the exhaust gas path 18 extends parallel to the longitudinal axis 13 from the first end wall 14 to a second end wall 21 at the bottom of the housing 12. An outlet opening 22 is formed in the end wall 21 and, with the inlet opening 15, is centered on the longitudinal axis 13. A plurality of lines represent a second portion 23 of the exhaust gas path 18 that extends at an angle to, generally horizontal, the first path portion 20 and leads to the exhaust gas outlet 16.

A generally tubular filter element 24 having a wall 25 is disposed in the interior of the housing 12 with an exterior surface of the wall 25 spaced radially inwardly from an interior surface of the housing wall 17, forming an outlet chamber 19 that occupies the space between the walls 17 and 25. The filter element 24 has a first or upper end 26 adjacent to the first end wall 14 and a second or lower end 28 adjacent to the second end wall 21. A central aperture 29 extends axially through the filter element 24 and is defined by the wall 25. The central aperture 29 extends between and is in fluid communication with the inlet opening 15 and the outlet opening 22. The filter element 24 is preferably a ceramic type filter having the wall 25 formed of a filter material suitable for trapping particulates entrained in the exhaust gas stream. The first path portion 20 of the exhaust gas path 18 extends from the inlet opening 15 along the central aperture 29 to the outlet opening 22. The second path portion 23 of the exhaust gas path 18 extends from the central aperture 29 of the filter element 24, through the wall 25, through the outlet chamber 19, and to the gas outlet 16.

A generally cup-shaped particulate reservoir 30 is releasably attached to the housing 12 at the second end wall 21. An opening of the reservoir 30 is in communication with the outlet opening 22. During operation of the filter 10, some of the entrained particulate may drop from the exhaust gas travelling along the first path portion 20 into the particulate reservoir 30 due to gravitational force. The remaining entrained particulate in the exhaust gas passing through the filter wall 25 can be trapped by the filter element 24. Because the lower end of the central aperture 29 is not closed, the exhaust flow velocity at the bottom of the first path portion 20 is advantageously not zero. Consequently, the particulate will deposit more evenly along the axial length of the wall-flow filter element 24. If a thermal regeneration is initiated from the upstream side of the filter element 24, the hot oxidant can reach the bottom end of the filter easily because of the open end, thus producing a more thorough regeneration. After thermal regeneration, the metallic ash can drop into the particulate reservoir 30, again due to gravitational force. The normal vibration of the vehicle may also shake some of the deposited particulate and ash off from the filter surface 25. The particular geometry of the filter 24 and the exhaust gas path 18 allows the flaked-off particulate to drop down into the particulate reservoir 30. When the particulate reservoir 30 is removed from the housing 12, the filter surface is accessible due to the open end, which allows the filter surface to be cleaned mechanically.

Another advantage of the particulate filter 10 according to the present invention over prior art particulate filters is that more frontal open area can be assigned to the intake side of the filter than to the exhaust side of the filter. Prior art particulate filters typically have the same area for the intake and exhaust sides. Since particulate will deposit on the surface of the intake side, one needs more frontal open area to minimize the flow restriction. The intake side of the filter 10 is the interior surface area of the filter wall 25 since the exhaust gas can flow through the wall in any radial direction at any height along the first path portion 20 as shown by the multiple second path portions 23. The gas then collects in the outlet chamber 19 before exiting the housing 12 through the gas outlet 16.

Figure 2:
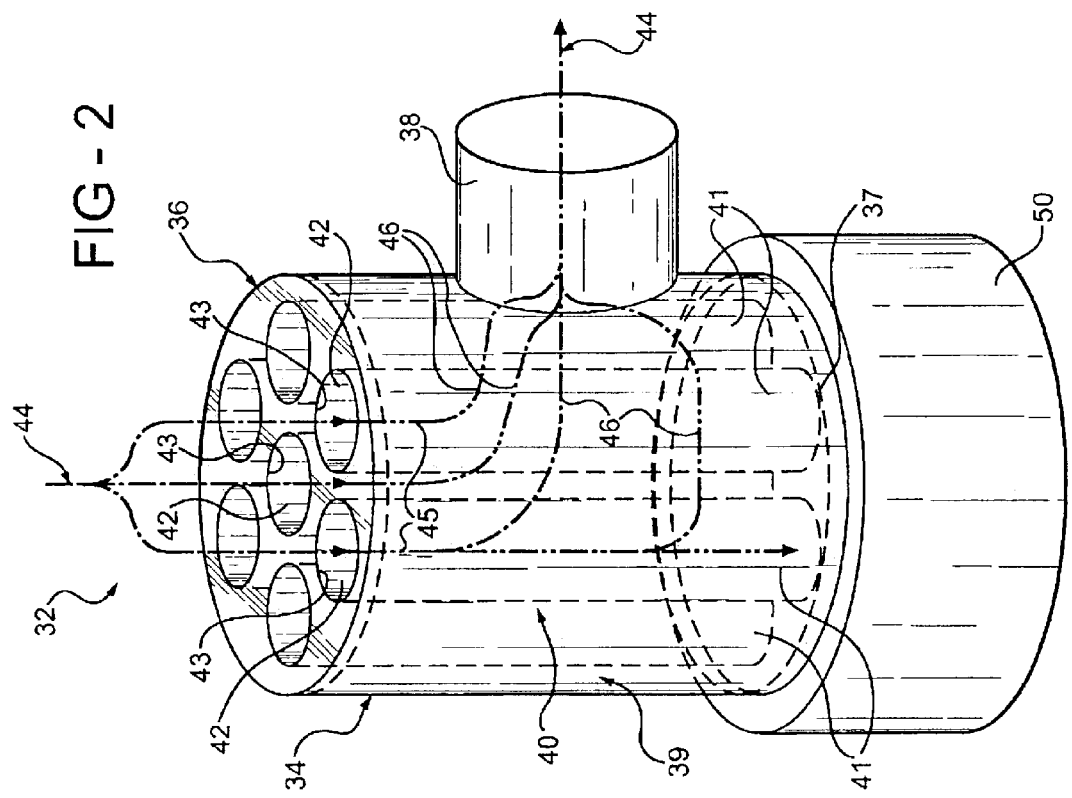
FIG. 2 is a fragmentary perspective view of an alternative embodiment of a particulate filter in accordance with the present invention.

Referring now to FIG. 2, an alternative embodiment of a diesel particulate filter according to the present invention is indicated generally at 32. The particulate filter 32 is adapted to be installed in the piping of an exhaust system of an internal combustion engine (not shown), such as a diesel engine installed in a vehicle (not shown). The particulate filter 32 includes a cylindrical hollow housing 34 similar to the housing 12 and having a first end wall 36, a second end wall 37 and a gas outlet 38. A particulate reservoir 50, similar to the reservoir 30, is releasably attached to the housing 34 at the lower or second end wall 37.

Retained in the housing 34 is a filter means 40 including a plurality of individual filter elements 41 similar to the filter element 24, but of smaller diameter. Each of the filter elements 41 has a central aperture 42 extending between an associated one of a plurality of inlet openings 43 and the particulate reservoir 50. An outlet chamber 39 occupies the space between the walls of the housing 34 and the walls of the filter elements 41. An exhaust gas path 44 is split at the inlet openings 43 into a plurality of first path portions 45 each associated with one of the central apertures 42. Second path portions 46 extend from each of the first path portions through the wall of the filter elements 41 before joining at the gas outlet 38. Thus, the filter 32 functions in a manner similar to the filter 10 with particulates and ash falling into the removable particulate reservoir 50.

In operation, the particulate filter 10 or 32 is installed in the exhaust system of the internal combustion engine. The inlet opening 15 or 43 of the filter element 24 or 41 is connected to the piping extending from the internal combustion engine and the outlet 16 or 38 of the housing 12 or 34 is connected to the piping that further extends to atmosphere. The internal combustion engine is operated normally, which produces exhaust gas (not shown) containing particulates (not shown) entrained therein. When the exhaust gas enters the inlet opening 15 or 43 and flows through the central aperture 29 or 42, the particulates in the exhaust gas in the first path portion can fall into reservoir 30 or 50. The particulates in the exhaust gas in the second path portion 23 or 46 are trapped in the filter wall material to be burned when the filter element 24 or the filter elements 41 are heated. The resultant ash drops into the particulate reservoir 30 or 50 and is collected for later disposal.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for installation in the piping of an exhaust system of an internal combustion engine for removing particulates from an exhaust gas stream, comprising:
    a hollow housing having an inlet opening at a first end, an outlet opening at a second end and a gas outlet at a side;
    a filter means having a central aperture extending between a first end and a second end and being defined by a filter wall, said filter means being disposed in said housing with said central aperture being in communication with said inlet opening and said outlet opening, said central aperture defining a first path portion of an exhaust gas path passing through said housing from said inlet opening to said gas outlet, a second path portion of said exhaust gas path extending at an angle from said first path portion from said central aperture through said filter wall to said gas outlet; and
    a particulate reservoir attached to said housing in communication with said outlet opening, whereby when said housing is installed in the piping of an internal combustion engine exhaust system and the exhaust gas flows along said exhaust gas path, particulates in the exhaust gas flowing along the first path portion can fall into said reservoir through said outlet opening and particulates in the exhaust gas flowing along the second path portion can be trapped in said filter wall.

2. The apparatus according to claim 1 wherein said housing has a generally cylindrical shape.

3. The apparatus according to claim 1 wherein said filter means is a generally tubular free-flow ceramic type filter element.

4. The apparatus according to claim 1 wherein said filter means is a plurality of tubular filter elements each having a central aperture defining said first path portion.

5. The apparatus according to claim 1 said particulate reservoir is releasably attached to said housing.

6. The apparatus according to claim 1 wherein said first path portion extends in a generally vertical direction and said second path portion extends in a generally horizontal direction.

7. A particulate trap for removing particulates from the exhaust gas stream of a diesel engine, comprising:
    a hollow housing having an inlet opening at a first end, an outlet opening at a second end and a gas outlet at a side;
    a filter means having a central aperture extending between a first end and a second end and being defined by a filter wall, said filter means being disposed in said housing with said central aperture being in communication with said inlet opening and said outlet opening, said central aperture defining a first path portion of an exhaust gas path passing through said housing from said inlet opening to said gas outlet, a second path portion of said exhaust gas path extending at an angle from said first path portion from said central aperture through said filter wall to said gas outlet; and
    a particulate reservoir releasably attached to said housing in communication with said outlet opening, whereby when said housing is installed in the piping of a diesel engine exhaust system and the exhaust gas flows along said exhaust gas path, particulates in the exhaust gas flowing along the first path portion can fall into said reservoir through said outlet opening and particulates in the exhaust gas flowing along the second path portion can be trapped in said filter wall.

8. The particulate trap according to claim 7 wherein said housing has a generally cylindrical shape.

9. The particulate trap according to claim 7 wherein said filter means is a generally tubular free-flow ceramic type filter element.

10. The particulate trap according to claim 7 wherein said filter means is a plurality of tubular filter elements each having a central aperture defining said first path portion.

11. The particulate trap according to claim 10 wherein each said filter element is a generally tubular free-flow ceramic type filter element.

12. The particulate trap according to claim 7 wherein said first path portion extends in a generally vertical direction and said second path portion extends in a generally horizontal direction.

13. The particulate trap according to claim 7 wherein an exterior surface of said filter wall of said filter means is spaced radially inwardly from an interior surface of a wall of said housing.

14. An open end diesel particulate trap for removing particulates from the exhaust gas stream of a diesel engine, comprising:
    a hollow housing having an inlet opening formed in a first end wall, an outlet opening formed in a second end wall and a gas outlet formed in a side wall, and having an exhaust gas path extending from said inlet opening to said gas outlet;
    a plurality of tubular filter elements each having a wall of filter material surrounding a central aperture, said central apertures defining a first path portion of said exhaust gas path, and a second path portion of said exhaust gas path passing through said filter element walls and extending at an angle to said first path portion of said exhaust gas path, and a particulate reservoir releasably attached to said housing and in communication with said central apertures of said filter elements, whereby when said housing is installed in the piping of a diesel engine exhaust system and the exhaust gas flows along said exhaust gas path, particulates in the exhaust gas flowing in said first path portion can fall into said reservoir and particulates in the exhaust gas flowing in said second path portion can be trapped in said filter element walls.

15. The particulate trap according to claim 14 wherein said housing has a generally cylindrical shape.

16. The particulate trap according to claim 14 wherein each of said filter elements is a generally tubular free-flow monolith type filter element.

17. The particulate trap according to claim 14 wherein said first path portion extends in a generally vertical direction and said second path portion extends in a generally horizontal direction.

18. The particulate trap according to claim 14 wherein an exterior surface of each of said filter walls is spaced radially inwardly from an interior surface of a wall of said housing.

* * * * *